United States Patent [19]

Frantl

[11] Patent Number: 4,993,235
[45] Date of Patent: Feb. 19, 1991

[54] WINDOW, FACADE AND WALL SYSTEM

[75] Inventor: Erich Frantl, Vienna, Austria

[73] Assignee: Conproject Handelsvertretung und techn. Buro fur Maschinenbau, Vienna, Austria

[21] Appl. No.: 359,798

[22] Filed: Jun. 1, 1989

[30] Foreign Application Priority Data

Jun. 6, 1988 [AT] Austria .................................. 1467/88

[51] Int. Cl.⁵ ............................................. F25B 27/00
[52] U.S. Cl. .................................. 62/235.1; 62/238.6; 237/213; 165/48.2
[58] Field of Search ................ 62/235.1, 324.1, 238.6; 237/2 B; 126/427, 428; 165/48.2, 48.1, 47

[56] References Cited

U.S. PATENT DOCUMENTS

| | | | |
|---|---|---|---|
| 3,981,294 | 9/1976 | Deminet et al. | 126/271 |
| 4,215,672 | 8/1980 | Chiapale et al. | 126/419 |
| 4,380,994 | 4/1983 | Seemann | 126/431 |

FOREIGN PATENT DOCUMENTS

| | | |
|---|---|---|
| 2826937 | 1/1980 | Fed. Rep. of Germany . |
| 2829523 | 1/1980 | Fed. Rep. of Germany . |
| 2833241 | 2/1980 | Fed. Rep. of Germany . |
| 3228364 | 2/1984 | Fed. Rep. of Germany . |
| 2273678 | 1/1976 | France . |

Primary Examiner—Henry A. Bennet
Attorney, Agent, or Firm—Beveridge, DeGrandi & Weilacher

[57] ABSTRACT

A window, facade or wall construction includes at least three panes of glass which are separated from one another to delimit at least two intermediary spaces. A heat-transfer medium which can be colored or pigmented is circulated through one of the intermediary spaces. If heat is to be absorbed from the outside in a winter mode of operation, the heat-transfer medium, which is colder than the outside temperature, is conducted through an outermost intermediary space. In the summer mode of operation, when heat is to be removed from the interior of a building by the heat-transfer medium, the medium is conducted through the intermediary space which is nearest the interior area. Intermediary spaces which do not conduct the medium function as additional insulators. The heat-transfer medium when heated in this manner can be fed to a heat pump or the like. Alternatively, the heat-transfer medium can be stored, with or without a heat-pump transformer, in a reservoir in order to compensate for short-term variations in temperature such as occur between day to night.

10 Claims, 2 Drawing Sheets

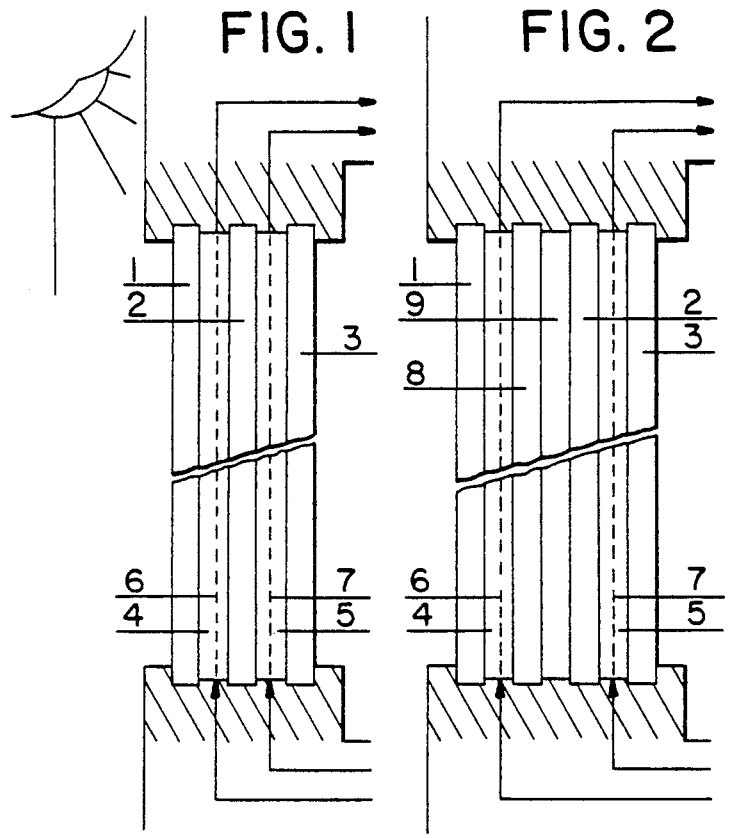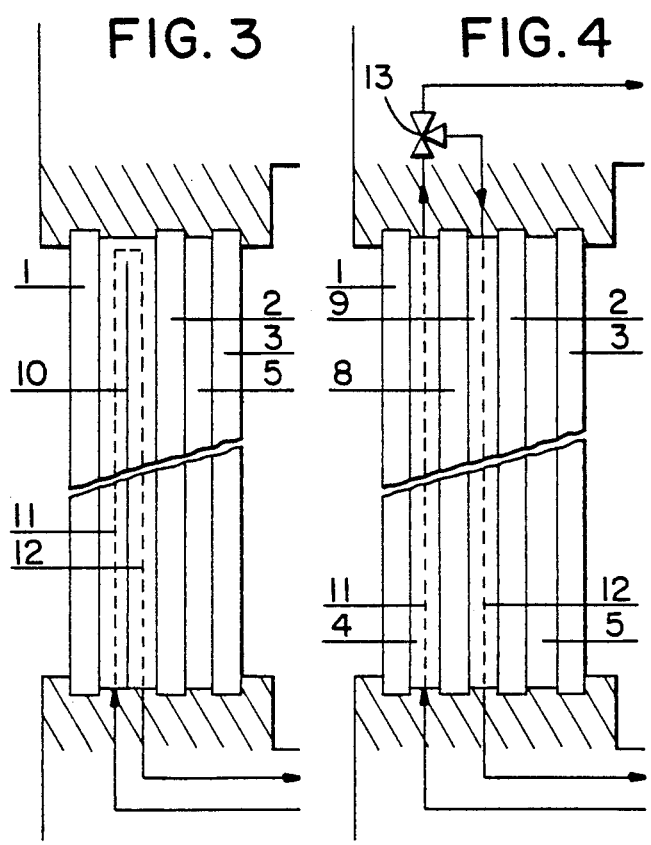

4,993,235

WINDOW, FACADE AND WALL SYSTEM

BACKGROUND OF THE INVENTION

The invention relates to a window, facade and wall system which includes at least three panes of light-permeable and heat-permeable material such as glass or the like. The panes are separated from each other to delimit a number, n, of intermediary spaces therebetween. Lines or conduits conduct a heat-transfer medium, which optionally, could be colored and/or pigmented with colored or reflecting pigments through at least one of the intermediary spaces. A heat pump is provided in the circuit of the heat-transfer medium together with a switching means to regulate flow of the heat-transfer medium through no more than n−1 of the intermediary spaces.

One known system of utilizing environmental energy utilizes absorber elements arranged on the outer wall of a building. Heat is removed from the environment by these elements, which are usually large in area, and highly transformed by at least one heat pump so that it can be utilized for example for the preparation of warm water or for heating purposes. The use of heat pumps, which for example are electrically operated, as devices for the utilization of energy present in the environment is known.

Approximately three times the energy consumed can be obtained with the described system for heating purposes in average outdoor temperatures of just above 0° C., which prevail in temperate zones in winter.

It is also known that the ratio of useful energy to energy consumed for the operation of a heat pump becomes increasingly disadvantageous with lowering outdoor temperatures and higher required temperature.

In the case of known outer-wall absorbers which can be attached to roofs or facades, energy is removed primarily from ambient air since the thermal insulation properties of the outer walls of the building located between the absorber surfaces and the inner area of the building can be correspondingly high.

A known weakness in the thermal insulation of any building is at the window areas because heat transition coefficients of below approximately 1.5 W/m² K (heat transition coefficient for a finished window with frame) can not be obtained even if insulating glass is used. This heat transition coefficient is approximately 5 to 10 times greater than that of a good outer wall construction. It has been shown that in an average building having good outer insulation, approximately 50% of the heat transmission losses occur at the windows, with double glazing.

However, window areas present a problem not only in winter but also in summer. They are the critical area of a house facade with regard to protection from elevated outdoor temperatures. The summer heat load consists largely of heat radiation, which presently only can be prevented by shading or by reflection during its passage through window areas, or this passage at least can be reduced.

Windows, in contrast to good outer wall constructions having large masses, have no capacity to store heat. Therefore windows can not compensate for short-term temperature variations.

DE-OS 2 815 056 teaches a window which consists of four panes and in which a liquid heat-transfer medium is pumped through the middle intermediary space. Absorbed energy is removed from the medium by a heat-pump system.

DE-OS 2 736 137 describes a window consisting of more than five panes in which a heat-transfer medium does not flow through all the intermediary spaces. The heat-transfer medium, which can be colored, is conducted through the intermediary space adjacent a lower ambient temperature area. Stored energy also is removed by a heat pump from the heat-transfer medium according to DE-OS 2 736 137.

SUMMARY OF THE INVENTION

The present invention addresses the problem also of using the advantages of known absorber systems in the window area and at the same time suppressing the undesirably high heat transition through the windows, both in winter and in summer. In addition, the storage capacity in the window area should be increased in an indirect manner.

This problem is solved by the invention in a glass window, facade and wall system in that the intermediary space nearest the side of the construction at which the ambient air temperature is higher, is prevented from conducting a heat-transfer medium. The heat-transfer medium has a certain temperature upon entering an intermediary space, which certain temperature is lower than the ambient temperature on the side of the construction adjacent to the intermediary space through which the heat-transfer medium is permitted to flow. The heat-transfer medium flowing out of the conducting intermediary space is cooled to a temperature below the higher ambient temperature by a heat pump in the circuit of the heat-transfer medium, and then, the transformed heat obtained thereby is supplied to heat consumers and/or is stored.

In the system of the invention, heat transition is sharply reduced by the construction of the invention. Given the appropriate design, the heat transition even can be reduced to practically zero. One advantage of the system of the invention is the fact that the intermediary space through which no heat-transfer medium flows is effective as additional insulation. This space without the medium can be designed in the manner of insulating glass or compound glass comprising two panes connected to one another by a preferably transparent layer of plastic. According to the invention, a window construction has three or four panes separated from each other to permit the intermediary area between the outermost and its next adjacent pane to be loaded during winter with a liquid or gaseous, preferably clear, heat-transfer medium. In the summer, on the other hand, the intermediary space between the innermost and its adjacent pane can be loaded with the heat-transfer medium. The basic principle therefore is that the intermediary space between two panes nearest the higher ambient temperature is not supplied with the heat-transfer medium.

According to the invention, the heat-transfer medium has a temperature upon entering the intermediary space which is less than the ambient temperature on the external side adjacent such intermediary space through which the medium is conducted. As a result, during winter, the heat-transfer medium, which is colder than the outdoor temperature, absorbs heat from the construction which is formed as a window. At the same time, however, the heat-transfer medium also absorbs that portion of heat which passes to the outside from the interior of the building via the intermediary space which does not conduct a heat-transfer medium. As a result, the system of the invention becomes a "heat trap" with regard to heat passing from the interior to the outside. The heat loss which would occur in the case of customary window constructions is lowered therewith to practically zero, while additional heat is brought into the system by way of heat absorbed from the outside. It is essential for function as a heat trap that the temperature of the heat-transfer medium conducted through the intermediary space between two panes is not above the outdoor temperature at any point of the limiting area bordering on the ambient air.

It is also possible with the system of the invention to prevent the penetration of excess heat into a building if the intermediary space between the innermost pane and the pane located immediately in front of it is loaded with the heat-transfer medium. In this instance, the heat-transfer medium, which has a temperature lower than the temperature in the interior of the building, absorbs heat from the interior area and therefore cools the area. At the same time, due to the above-described behavior as a heat trap, the system prevents penetration of transmission heat from the building exterior. It is also necessary that for functioning as an effective heat trap, the temperature of the heat transfer medium flowing through the intermediary space between the innermost pane and its next adjacent pane does not rise at any point along the innermost pane to above the temperature in the interior of the building.

An embodiment of the system according to the invention has at least one intermediary space which is subdivided into two partial spaces by a preferably clear separating wall of the type which is permeable to light and heat radiation. At least one passage opening is defined by one of the horizontal edges of the separating wall, preferably in the lower edge to permit communication between the partial spaces. This embodiment makes it possible to achieve a pyrotechnic improvement in certain instances of the heat-transfer medium flowing through the intermediary space or spaces between panes. Preferably, the heat-transfer medium is conducted in a manner whereby it is first guided between the separating wall, which is formed for example as a membrane, and the colder window side. The medium is heated to just less than the outdoor temperature (in summer, to just under the interior temperature) and is then conducted into the second partial space between the separating wall and the warmer pane of glass, whereby it absorbs more heat as it flows through this second partial space. As a result, the temperature jump to useful heat is smaller, and there is the possibility of operating the heat pump with a lesser temperature elevation and thus with a smaller output coefficient or factor. This measure also makes it possible to avoid moisture films on the warmer window side when moist air is present at the warmer side.

A similar effect can be achieved in a system according to the invention having a construction with at least three intermediary spaces, that is, $n=3$, a line or conduit is provided for supplying a heat-transfer medium through the intermediary space facing the colder window side and a valve is provided in a line leading away from such intermediary space. A line from the valve runs directly to the heat pump. Another line runs to the central space of the three intermediary spaces and still another line runs from the central intermediary space to the heat pump. According to this embodiment, in winter the heat-transfer medium is first guided through the intermediary space between the outermost pane and the pane behind it and then through the next intermediary space. When the device is operated during summer, the heat-transfer medium first flows through the intermediary space between the innermost pane and it immediately adjacent pane. If the medium is not conducted into the central intermediary spaces, then the latter behave as an additional insulator.

The system of the invention is not limited to windows, especially glass windows, but also can provide a large-area facade or wall construction. When the construction is implemented as a facade or wall element, the heat obtained by the system of the invention can be used during the winter, for example, for interior heating, and during both summer and winter for heating water.

As has already been indicated, if the invention is realized in the form of a window construction, an intermediary space, between two panes which is not provided with heat-transfer medium (and thus which behaves as insulating glass) can be formed by a two-pane or multi-pane element in which the panes are connected to each other by an intercalated, clear plastic foil (compound glass like that customary in safety-glass and fire-protection glass).

Given the appropriate design, the system of the invention can enable monovalent heating of an entire object. It is advantageous for an appropriate heat supply that heat losses of the object can be reduced greatly by the "heat trap" affect and energy required to drive a heat pump is conserved as much as possible as heat energy.

The heat-transfer element used in conjunction with the device of the invention can be colored or pigmented if desired or necessary. It is preferred that the extent of coloration or pigmentation of the heat-transfer medium be variable. This embodiment offers the possibility, especially when used for interior area cooling in the summer, of further reducing the passage of radiant heat by means increasing the absorption capacity of the heat-transfer medium due to its coloration or pigmentation. Preferably, the coloration or pigmentation of the heat-transfer medium is done with a dye or pigment added to the medium. The coloration and the addition of pigments result not only in an increase of the heat-absorption capacity but also in shading visible light. The pigmentation or coloration of the heat-transfer medium can be increased, depending on the intended use and desire, up to being completely opaque in the window area. If a change in coloration or pigmentation is desired, this can be performed by means of a dosed supply, or by filtering out dyes or pigments from the heat-transfer medium, or by a chemical procedure such changing the pH the medium.

If a gaseous medium is used as the heat-transfer medium, there is the possibility of swirling up a supply of pigments which could be located at the lower portion of an intermediary space by increasing the flow speed through the intermediary space to maintain the pigments in suspension.

Coloration or pigmentation of the heat-transfer medium, which can be done for both a liquid or a gaseous heat-transfer medium, offers advantages both in summer and in winter.

The heat-transfer medium preferably is resistant to freezing and clear after the pigmentation has been filtered or chemically changed.

The intensity of the coloration and of the pigmentation automatically can be adapted to particular conditions by means of a control device equipped with means for measuring light-passage.

If a pigmented heat-transfer medium flows through the intermediary space between two panes in a construction according to the invention, suppression of UV radiation also can be achieved as well as protection against glare by selecting a pigment suitable for such purposes.

Using a colored or pigmented heat-transfer medium in accordance with the invention can obviate in both windows and greenhouses, the customary positioning of window shades and Venetian blinds, and the use of colored layers in greenhouses for shading during summer. This enables better temperature adjustments according to the needs of humans, animals and plants, at very low cost.

The shading effected by use of a pigmented or colored heat-transfer medium can reduce considerably nocturnal heat radiation, especially when the sky is clear.

In order to minimize the passage of rays through the construction of the invention, it is also possible to use highly reflective pigmentations in addition to pigments which enhance absorption. It is also possible to add components to the heat-transfer medium which are filtered out again if not required and which can be made to luminesce or glow by means of chemical and/or physical exciters.

The possibility of imparting different colors to facade and wall constructions by passing different colored heat-transfer media therethrough also results in designing display window facades and other advertizing surfaces and artistic objects, which optionally, could be used for advertizing purposes. In these instances, whether energy is obtained could be entirely or partially disregarded. Even glass intermediary walls can be rendered transparent or opaque by passing colored or pigmented media therethrough as required.

Variable pigmentation of glass intermediary walls with the same design for achieving variable sight protection, etc. is a further application.

Another embodiment of the device of the invention provides a reservoir in the circuit of the heat-transfer medium. The embodiment with the reservoir can be realized with or without heat pump. If only one reservoir is provided, heat compensation can be achieved by way of storing the medium heated during the day at rather high temperatures, or cooled during the night and then recirculating the medium back to the construction during the other portion of the 24-hour period. A buffer reservoir also can be provided as a supplement or alternative in the secondary circuit of another liquid heat-transfer medium which is highly transformed by the heat pump and also is used for the thermal circuit. On account of the higher energy content of a buffer reservoir contained in the secondary circuit, less storage volume is sufficient because the heat-transfer medium in the secondary circuit has a higher energy content. Storage in the secondary circuit is especially advantageous if a gaseous heat-transfer medium which is difficult to store is used in the primary circuit (passage of the heat-transfer medium through an intermediary space between two panes of glass). Storage of the medium passed through the intermediary spaces of the panes and reuse in another temperature phase alone can bring about temperature compensation in the interior.

The device of the invention has the additional advantage that in the case of fire, a window, facade or wall construction element also can be cooled in order to reduce the danger of transferring heat or fire.

The construction of the invention also can be used for heating. For example, a heated and preferably pigmented medium can be conducted through the intermediary space or spaces of the construction to heat a free surface disposed in front of the construction by radiant heat. Logically, inner areas also can be heated more rapidly by enlarging the heating surfaces, for example, by including a window construction in the heating surface.

The construction of the invention also offers the advantage of improved sound insulation if a liquid heat-transfer medium is selected.

Within the scope of the invention, it is possible to associate a pressure sensor with the heat transfer medium circuit. This enables monitoring for damage to the construction such as a forced entry by burglars.

If the construction of the invention is implemented as a window, it can be advantageous to interrupt the flow of the

BRIEF DESCRIPTION OF THE DRAWINGS

Other details and features of the invention will be even more apparent from the claims and the following description and drawings of the preferred embodiments. In the drawings:

FIGS. 1 through 4 show similar side-sectional views of four embodiments of a window construction in accordance with the system of the present invention.

DETAILED DESCRIPTION OF THE PREFERRED EMBODIMENTS

Figure 5:
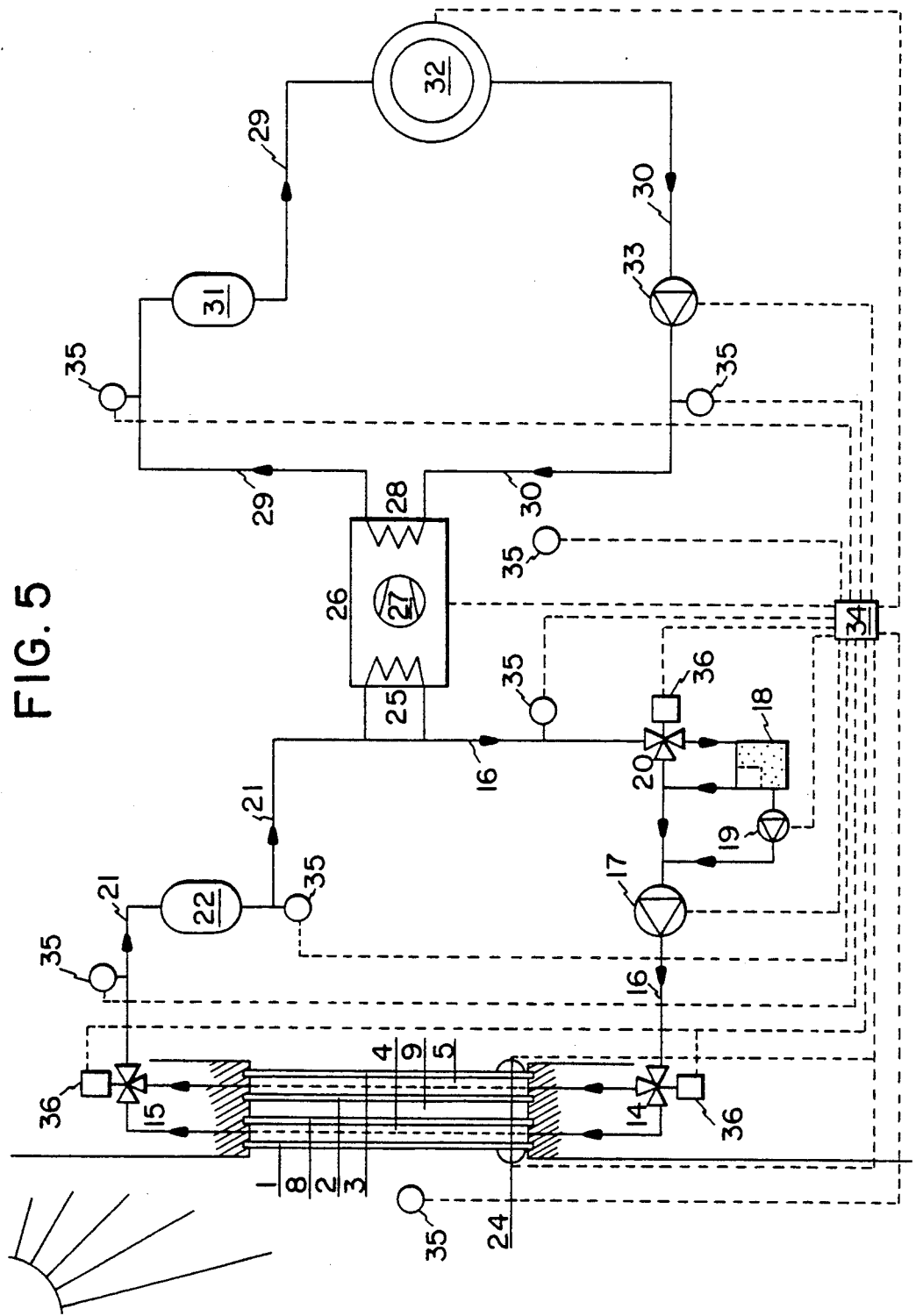
FIG. 5 is a schematic diagram of a primary circuit and a secondary circuit for the heat-transfer medium in connection with the embodiment of FIG. 2.

FIG. 1 shows a window construction with three glass panes 1, 2 and 3 between which two intermediary spaces 4, 5 are provided. In winter, a liquid or gaseous heat-transfer medium flows through the intermediary space 4 which is located nearer the outer side. Specifically, the intermediary space 4 is provided between panes 1 and 2 along a flow path 6 which is indicated by a dash line in FIG. 1. The inner intermediary space 5 is located between panes 2 and 3 nearer the side with a higher ambient temperature and therefore is not provided with a heat-transfer medium.

In summer, heat is not absorbed from the outdoor environment but rather, for example, should be removed from the interior of a structure. In order to cool the interior, the heat-transfer medium is conducted along flow path 7 shown in dash lines through the intermediary space 5 between the two glass panes 2,3 and the intermediary space 4 is not provided with heat-transfer medium.

The intermediary spaces 4 or 5 without the heat-transfer medium forms, together with its adjacent panes 1,2 or 2,3, an insulating element which can be filled, for example, with a dry gas.

Note that alternately providing one of the two intermediary spaces 4 or 5 with heat-transfer medium is not absolutely required. Embodiments are quite conceivable in which only the outside intermediary space 4 or only the inside intermediary space 5 would conduct the heat-transfer medium. In such instances, the intermediary space having the heat-transfer medium can be filled with a (preferably clear) plastic so that the two panes which define it are connected to one another in the manner of a compound glass.

The window construction shown in FIG. 2 comprises four glass panes 1,8 and 2,3 and defines three intermediary spaces 4,9 and 5. As can be seen from FIG. 2, no lines for transferring a heat-transfer medium are connected to the central intermediary space 9 between panes 2 and 8. The intermediary space 9 as well as outer and inner intermediary spaces 4 and 5 are not loaded in summer and in winter operation with heat-transfer medium in order to increase the thermal insulation.

The intermediary spaces which are not provided with the heat-transfer medium according to the embodiment of FIG. 2 can be filled with a dry gas. It is also possible to connect the two panes 8 and 2, which define intermediary space 9 in FIG. 2, to one another by means of a clear plastic insulator (not shown) or to fill the intermediary space 9 with a clear or colored medium.

If a construction similar to that of FIG. 2 is used as a glass facade element and is required to be opaque, the intermediary space 9 also can be filled with a thermal insulation mass. Logically, this also applies to opaque embodiments having three panes if the objective is only heat absorption from the outside during winter and interior cooling during summer.

FIG. 3 shows another embodiment of a window construction having three panes which is somewhat similar to the window construction shown in FIG. 1. Separating wall 10, which can comprise a clear thin membrane or a thin pane of glass, is provided between the two glass panes 1,2 in intermediary space 4. Intermediary space 4 is subdivided by the separating wall 10 into two partial spaces which communicate with one another at the upper end of separating wall 10. It is understood that the passage opening provided at the upper end of the separating wall 10 also can be provided in the area of the lower edge of intermediary space 4, between the two glass panes 1,2, as is usually the case, in particular, when a liquid heat-transfer medium is used.

During operation of the window construction shown in FIG. 3 for absorbing outside heat for example, during winter operation, the heat-transfer medium is introduced along flow path 11 into the partial space between glass pane 1 and separating wall 10 and removed from intermediary space 4 along flow path 12 via the partial space between glass pane 2 and separating wall 10.

It is understood that during the operation of the window construction shown in FIG. 3 for cooling an interior area, for example, during operation in summer, intermediary space 5 can be provided with a separating wall 10 for subdivision into two partial spaces. A separating wall such as separating wall 10 can be provided in addition to, or instead of providing wall 10 in space 4.

Another embodiment of a window construction in accordance with the invention is shown in FIG. 4 to have a design which is similar to the window construction of FIG. 2, whereby intermediary spaces 4 and 9 between glass pane pairs 1 and 8, and 8 and 2, respectively function like the partial spaces on both sides of separating wall 10 in the embodiment shown in FIG. 3. In particular, in the embodiment of FIG. 4, the heat-transfer medium flows through intermediary space 4 along flow path 11 and can be guided into intermediary space 9 between glass panes 8 and 2 by an adjusting valve 13 located outside of the window area.

Valve 13 permits the embodiment shown in FIG. 4 to be operated like the embodiment shown in FIG. 2, whereby the heat transfer medium is guided exclusively through intermediary space 4, so that both intermediary space 9 and intermediary space 3 behave as insulators. Switching from one mode of operation to the other is carried out for the window construction shown in FIG. 4 by appropriately adjusting switch valve 13.

The mode of operation described previously with reference to FIG. 4 for winter operation wherein ambient heat is absorbed, logically, also can be used for summer operation, wherein heat is absorbed from the interior of a building having the window construction of FIG. 4, by using intermediary space 5 and, optionally, intermediary space 9.

FIG. 5 is a schematic wiring diagram of a primary circuit and secondary circuit of a heat-transfer medium for use with the window shown in FIG. 2. The left portion of FIG. 5 shows the window with four panes in accordance with FIG. 2. The outermost pane 1, together with pane 8 adjacent to it, define intermediary space 4 through which the heat-transfer medium flows during winter. No heat-transfer medium is made to flow through the other two intermediary spaces 5 and 9 which act to increase the insulation properties of the window.

Innermost pane 3 and pane 2 adjacent to it, define the intermediary space 5 which is made to conduct the heat-transfer medium during summer mode operation whereas the two other intermediary spaces 9 and 4 are not provided with the heat-transfer medium and therefore form insulation spaces for increasing the thermal insulation. The intermediary spaces which are not provided with the heat-transfer medium can be filled with a dry gas to prevent the glass panes which delimit these intermediary spaces from becoming coated or misted. It is understood that the intermediary spaces which are not made to conduct a heat-transfer medium could be filled with another free-flowing medium.

Switching of the heat-transfer medium to the particular intermediary space through which the medium is to flow is made by appropriately adjusting control valves 14 and 15. Transport member 17 is provided in feed line 16 to conduct the heat-transfer medium through the selected intermediary space. This transport member could comprise a pump for a liquid heat-transfer medium or a ventilator for a gaseous heat-transfer medium.

Furthermore, a device 18 is provided with an associated dosing pump 19 for adding or separating pigments. Device 18 and pump 19 are connected to line 16 by way of a regulated bypass. Addition or separation of pigments or other dyes can be regulated by a light-passage meter 24 associated with the window construction. It is understood that other additives, instead of pigments, can be mixed with the heat-transfer medium. The bypass ratio is regulated by three-way valve 20.

A primary buffer reservoir 22 is built into the line 21 which leads away from the window. Reservoir 22 provides means to compensate for variations in fluid flow and to avoid switching cycles of heat pump 26 having insufficiently long duration.

Pressure sensor 35 is provided in line 21 to detect loss of the heat-transfer medium or to detect that circulation of the medium has ceased. Sensor 35 thus also reacts to detect destruction of the window such as if the glass were broken during a burglary or the like.

The heat-transfer medium is transported via buffer reservoir 22 into an evaporator 25 of a heat pump 26 where it is cooled, and then recirculated to the window construction.

The cooling agent compressed in compressor 27 of heat pump 26 transfers its heat in condenser 28 of heat pump 26 to the heat transfer medium as it circulates through a secondary circuit. This secondary circuit has a supplying pipeline 29 a removing pipeline 30, a secondary buffer reservoir 31, a consumer 32, and a circulating device 33 in the form of a pump or a ventilator. If waste heat from heat pump 26 is used for direct heating with warm air, the last-named elements in the system can be eliminated because, in this instance, condenser 28 can be cooled directly by the passage of air which it therefore heats and returns to the interior.

The system shown in FIG. 5 is regulated via central electronic circuitry 34 together with the associated sensors 35 and final control elements 36 of the type used in well known environmental absorber systems and heat-pump systems. The associated measuring lines and control lines are indicated by dash lines in FIG. 5.

What is claimed is:

1. A window, facade or wall system comprising:
    a construction having at least three panes formed of light-permeable and heat-permeable material, the panes being separated from each other to form a number, n, of intermediary spaces therebetween;
    conduits for providing a fluid flow circuit to conduct a heat-transfer medium through at least one of the intermediary spaces;
    switching means for regulating the flow of heat-transfer medium through no more than n − 1 of the intermediary spaces to prevent the intermediary space nearest a first side of the construction from conducting heat-transfer medium when such first side is exposed to air having a relatively higher ambient temperature than the air which exposes the opposite side of the construction and to conduct heat-transfer medium through the intermediary space nearest the opposite side; and
    a heat pump provided in the fluid flow circuit for circulating the heat-transfer medium, the heat pump cooling heat-transfer medium flowing out of the intermediary space nearest the opposite side to a temperature below the ambient temperature at the first side of the construction.

2. The system according to claim 1, wherein the heat-transfer medium comprises a coloring agent and the degree of coloration of the medium can be varied.

3. The system according to claim 1, wherein the heat-transfer medium comprises a gas or a liquid.

4. The system according to claim 1, further comprising a separating wall in at least one of the intermediary spaces, the separating wall subdividing such intermediary space into two partial spaces connected by a passage delimited by a horizontal edge of the separating wall.

5. The system according to claim 4, wherein heat-transfer medium is first introduced into only one of the two partial spaces, said partial space being located nearer the opposite side of the construction which side is exposed to air having the relatively lower ambient temperature.

6. The system according to claim 1, wherein the system has three intermediary spaces including a central space, a conduit is provided to conduct the heat-transfer medium through the intermediary space nearest the relatively colder side of the construction, a valve is provided in a portion of the conduit leading away from the intermediary space nearest the colder side, a conduit for the heat-transfer medium runs directly from the valve to the heat pump, a conduit runs to the central space, and a line runs from the central intermediary space to the heat pump.

7. The system according to claim 1, wherein a pressure sensor is associated with the flow circuit of the heat-transfer medium.

8. The system according to claim 1, wherein a reservoir is provided in the flow circuit of the heat-transfer medium.

9. The system according to claim 1, wherein a dry gas is introduced into the intermediary space which is prevented from conducting the heat-transfer medium.

10. The system according to claim 1, wherein at least one intermediary space which is prevented from conducting heat-transfer medium is filled with a clear, solid, liquid or gaseous insulation.

* * * * *